Dec. 21, 1937.   A. H. McKEAG ET AL   2,103,085
ELECTRIC LAMP
Filed July 16, 1937
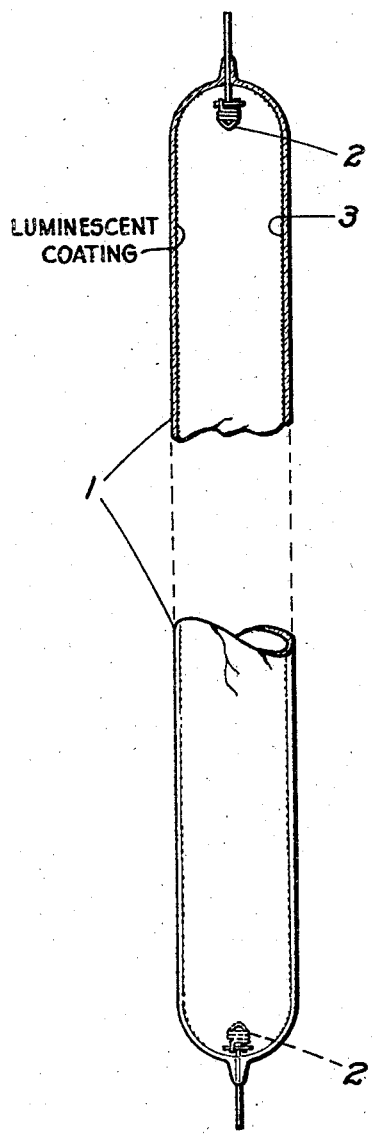
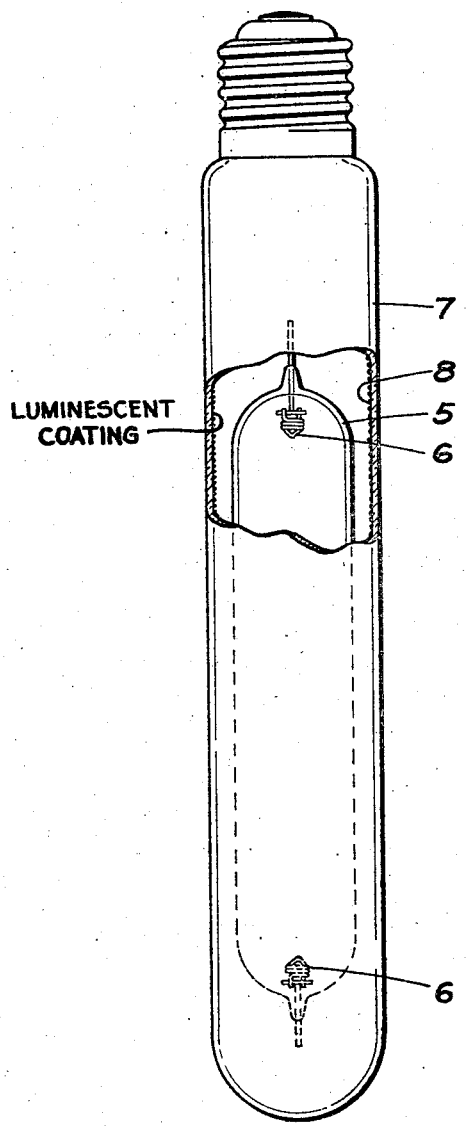
INVENTORS
Alfred H. McKeag.
John T. Randall
BY Harry E. Dunham
ATTORNEY Patented Dec. 21, 1937

2,103,085

UNITED STATES PATENT OFFICE 2,103,085

ELECTRIC LAMP

Alfred Hamilton McKeag and John Turton Randall, Middlesex, England, assignors to General Electric Company, a corporation of New York Application July 16, 1937, Serial No. 154,085
In Great Britain July 23, 1936

4 Claims. (Cl. 176—122)

The present invention relates to electric lamps of the gaseous discharge type and particularly to lamps producing at least part of their light by luminescence.

A particular object of the invention is to provide a light source of high luminous efficiency. Another object of the invention is to provide a source of light which will closely approximate "white" light. A further object of the invention is to provide a lamp of this type which will have a long useful life. Still other objects and advantages of the invention will appear from the following detailed specification or from an inspection of the accompanying drawing.

The invention consists in the new and novel combination of elements hereinafter set forth and claimed.

Most gaseous discharges emit ultraviolet light in addition to the visible light. From time to time efforts have been made to convert these ultraviolet radiations into visible light, both to increase the luminous efficiency of the light source and to modify the color thereof. Since the mercury vapor discharge is especially rich in ultraviolet radiations and also has a high luminous efficiency of itself it is especially suitable for use in our novel lamp, but it is to be understood that the invention is not limited thereto.

Materials adapted to be excited to luminescence by a gaseous mercury discharge usually consist of a main component (for example zinc silicate or zinc sulphide) and an activating impurity (for example manganese); the presence of the impurity is essential to the excitation of the luminescence. No term is in general use to denote the main component apart from the impurity; we purpose to term it a "matrix." A luminescent substance means a substance adapted to be excited to luminescence, not necessarily one actually luminescent.

One of the best known luminescent substances heretofore used in lamps of the type specified is willemite, which consists of a matrix of zinc orthosilicate ($2ZnO.SiO_2$) containing manganese as the activating impurity. The excitation is highly efficient, but the color of the luminescent light, being bright green, is in some cases objectionable. The object of this invention is to provide a luminescent material which is not only of the same order of efficiency as willemite, but which also gives a luminescent light which supplements the visible radiations of the discharge to produce a light which is substantially white.

We have found that such a material is obtained by replacing the zinc in willemite in part by beryllium. Beryllium orthosilicate and zinc othosilicate are isomorphous, so that a continuous series of solid solutions can be obtained ranging from $2BeO.SiO_2$ to $2ZnO.SiO_2$. We have found that the best composition for the matrix is substantially that represented by the formula $BeO.ZnO.SiO_2$. The luminescent light produced thereby is yellowish, and the spectrum extends from the green to the red.

According to the invention in a lamp of the type specified the matrix of the said luminescent material is a zinc-beryllium silicate, wherein the proportion of beryllium is sufficient to render the resulting light substantially whiter than that given by zinc silicate with the same activating impurity. A suitable activating impurity is manganese.

One method of preparing a luminescent material for a lamp according to the invention will now be given by way of example. Beryllium oxide, zinc oxide and silica, all extremely pure, are finely powdered and mixed together in the molecular proportions $BeO.ZnO:SiO_2$ with sufficient pure water to form a stiff paste. To this is added sufficient manganese chloride solution to give 0.5% Mn. in the final product. The paste, into which the manganese chloride has been mixed, is dried for one hour at about 200° C. The resulting mass is crushed to powder and mixed well, after which it is placed in a silica boat and heated in air 3 or 4 hours to about 1250° C. The material is then ground and sieved to the desired particle size. It is then ready for use in the usual manner.

The material is used in cold cathode tubes, especially those operated at high voltages and suitable for signs and the like. The filling of the tube is preferably the usual mercury-argon mixture now in common use, but other suitable gases are used where desired. The color of the light obtained is so nearly white that the lamp does not (like so many so-called white tubes) appear colored when in the neighborhood of highly colored tubes. The material is also used in hot cathode tubes for interior lighting; the color is then sufficiently white to need no "correction."

Efficiencies between 30 and 40 lumens per watt are obtained; in equally white lamps of the type specified known hitherto, the efficiency has rarely, if ever, exceeded 30 lumens per watt.

We have also found that this zinc-beryllium silicate is particularly suitable for use in combination with high pressure mercury-vapor discharge devices, and more particularly with those in which the envelope is of quartz. The luminescent material is in this case applied, not to the interior of the envelope enclosing the discharge, but to some surface outside that envelope, for example, to the inner wall of a jacket in which the said envelope is normally enclosed. The luminescence is therefore in this case excited by the radiations that penetrate the quartz vessel. It has been found that the radiations which excite zinc-beryllium silicate to luminescence lie roughly between wave-lengths 2800 A. and 2000 A. and below, and it is well-known that quartz transmits radiations lying in this region of the spectrum, so that the excitation of the fluorescence is very efficiently produced.

The luminescent light from beryllium silicate, excited by the radiation from a mercury discharge in quartz, is well adapted to correct the color of the light from such lamps by supplying the visible radiation in which the lamps are deficient. Another reason for the especial suitability of zinc-beryllium silicate in these lamps is that the luminescence thereof is not greatly affected by maintenance for long periods at temperatures considerably above atmospheric. Still another reason is that the overall luminous efficiency of such a combination is extremely high, at least as great as that of the discharge device without luminescent powder. In combinations of this kind where the excitation to luminescence is by radiation only, (as distinguished from excitation by direct contact with the discharge), the use of some luminescent materials leads to lower overall efficiency, and it is important to realize that zinc-beryllium silicate is not of this inefficient type.

For the purpose of illustrating our invention we have shown in the accompanying drawing two preferred embodiments thereof, in which Fig. 1 is an elevational view in part section of a low intensity lamp of the type used for signs, general illumination and the like, and Fig. 2 is a similar view of a high pressure, high intensity type of mercury vapor arc lamp which is now well known.

As shown in this drawing, with particular reference to Fig. 1, our novel lamp has a sealed tubular envelope 1 of glass or the like with an electrode 2 sealed into each end thereof. As shown these electrodes are thermionic cathodes of the activated type which are heated to emission by the discharge, but it is to be understood that any other suitable type of electrode may be substituted therefor, and that where very low currents are employed, as in sign lamps and the like, that any of the well known "cold" cathodes may be employed. The envelope 1 contains any suitable atmosphere, but a filling of argon at a pressure of the order of 1.5 to 3.0 mm. plus sufficient mercury to develop the desired pressure is preferred. A coating 3 of our novel zinc-beryllium silicate is produced on the inner surface of the envelope 1 in any suitable manner, many methods of producing such a coating being now well known.

When this device is energized to produce a discharge between the electrodes 3 the zinc-beryllium silicate is excited to luminescence by the ultraviolet radiations emitted by the discharge as well as by the direct impact of the discharge thereon, and the resulting luminescent light complements the visible light emitted by the discharge to produce substantially white light.

In the device of Fig. 2 the discharge envelope 5 is of quartz or other ultraviolet transmitting material and has sealed therein a pair of electrodes 6 of the activated self-heating thermionic type. This envelope preferably contains a rare gas, such as argon, at a pressure of a few millimeters, plus a quantity of mercury which is usually designed to be wholly evaporated when the lamp reaches operating temperature, the pressure then being ordinarily of the order of an atmosphere or more. An enclosing jacket 7 of glass or the like is provided about the envelope 1 to conserve the heat generated by the lamp. This jacket is wholly evacuated, or when desired contains a gas such as nitrogen at a suitable pressure of say half an atmosphere. A coating 8 of our novel zinc-beryllium silicate, is provided on the inside of this jacket. Since the quartz envelope 5 is permeable to the ultraviolet radiations of from 2800 A. to 2000 A. and even less which excite this luminescent material the discharge within the envelope 1 causes this coating to emit its characteristic luminescent light which complements the visible light from the discharge to produce a white light. Since the coating 8 offers but little obstruction to the visible radiations coming from the discharge the luminous efficiency of the unit is extremely high.

While we have disclosed our invention by reference to certain specific embodiments thereof it is to be understood that it is not limited thereto, but that various omissions, substitutions and changes, within the scope of the appended claims, may be made therein without departing from the spirit of the invention.

What we claim as new and desire to secure by Letters Patent of the United States, is:—

1. A lamp comprising an electric gaseous discharge device in combination with a coating of zinc-beryllium silicate together with a suitable impurity exposed to the radiations therefrom.

2. A lamp comprising an electric gaseous discharge device containing mercury and having a coating of zinc-beryllium silicate in substantially the proportions indicated by the formula $BeO.ZnO.SiO_2$ together with 0.5% of manganese exposed to the radiations from said device, whereby the light emitted by said device when a discharge is produced therein is substantially white.

3. A lamp comprising an electric gaseous discharge device having a sealed envelope, said envelope having a coating of zinc-beryllium silicate together with a suitable impurity such as manganese on the inner surface thereof.

4. A lamp comprising an electric gaseous discharge device having an envelope permeable to radiations of shorter wave length than 2800 A., a jacket enclosing said envelope, and a coating of zinc-beryllium silicate together with a suitable impurity such as mangenese on the inner surface of said jacket.

ALFRED HAMILTON McKEAG.
JOHN TURTON RANDALL.